United States Patent [19]

Morimoto et al.

[11] Patent Number: 5,016,233

[45] Date of Patent: May 14, 1991

[54] OPTICAL SCANNING ARRANGEMENT FOR MAINTAINING CONSTANT THE LIGHT OUTPUT OF A LASER BEAM OR THE LASER CURRENT

[75] Inventors: Yasuaki Morimoto, Villingen-Schwenningen; Heinz J. Schröder, VS-Marbach; Friedhelm Zucker, Villingen-Schwenningen, all of Fed. Rep. of Germany

[73] Assignee: Deutsche Thomson-Brandt GmbH, Villingen-Schwenningen, Fed. Rep. of Germany

[21] Appl. No.: 250,726

[22] Filed: Sep. 28, 1988

[30] Foreign Application Priority Data

Sep. 30, 1987 [DE]  Fed. Rep. of Germany ....... 3732903

[51] Int. Cl.$^5$ .............................................. G11B 7/00
[52] U.S. Cl. ................................ 369/44.13; 369/116; 250/201.5
[58] Field of Search ...................... 369/44, 45, 46, 106, 369/116, 43, 44.13, 44.14, 116; 250/201, 201.5

[56] References Cited

U.S. PATENT DOCUMENTS

| | | | |
|---|---|---|---|
| 2,952,191 | 4/1976 | Tinet | 369/45 |
| 3,952,191 | 4/1976 | Tinet | 369/45 |
| 4,150,402 | 4/1979 | Tretze | 369/116 |
| 4,190,775 | 3/1980 | Sakurai | 369/45 |
| 4,352,981 | 10/1982 | Sugiyama et al. | 569/44.13 |
| 4,363,961 | 12/1982 | Okada | 369/45 |
| 4,488,276 | 12/1984 | Tanaka et al. | 369/44.13 |
| 4,774,698 | 9/1988 | Henmi | 369/45 |
| 4,870,635 | 9/1989 | Block et al. | 356/358 |

*Primary Examiner*—Roy N. Envall, Jr.
*Assistant Examiner*—Thang V. Tran
*Attorney, Agent, or Firm*—Max Fogiel

[57] ABSTRACT

An optical scanning arrangement in which a laser beam is generated by a source with a monitor diode. The laser beam is focused on an optical recording medium. A summing amplifier has a first input connected to a source of a periodic signal. This source of periodic signal is also connected to a first input of a multiplier. The multiplier has an output connected to a second input of the summing amplifier. This summing amplifier has an output connected to a positioning device in the focusing circuit for the laser beam. This focusing circuit has an actual value which is supplied to a third input of the summing amplifier. The multiplier receives a laser controlling signal on a second input for the purpose of maintaining the light output of the laser beam at a constant level.

4 Claims, 4 Drawing Sheets

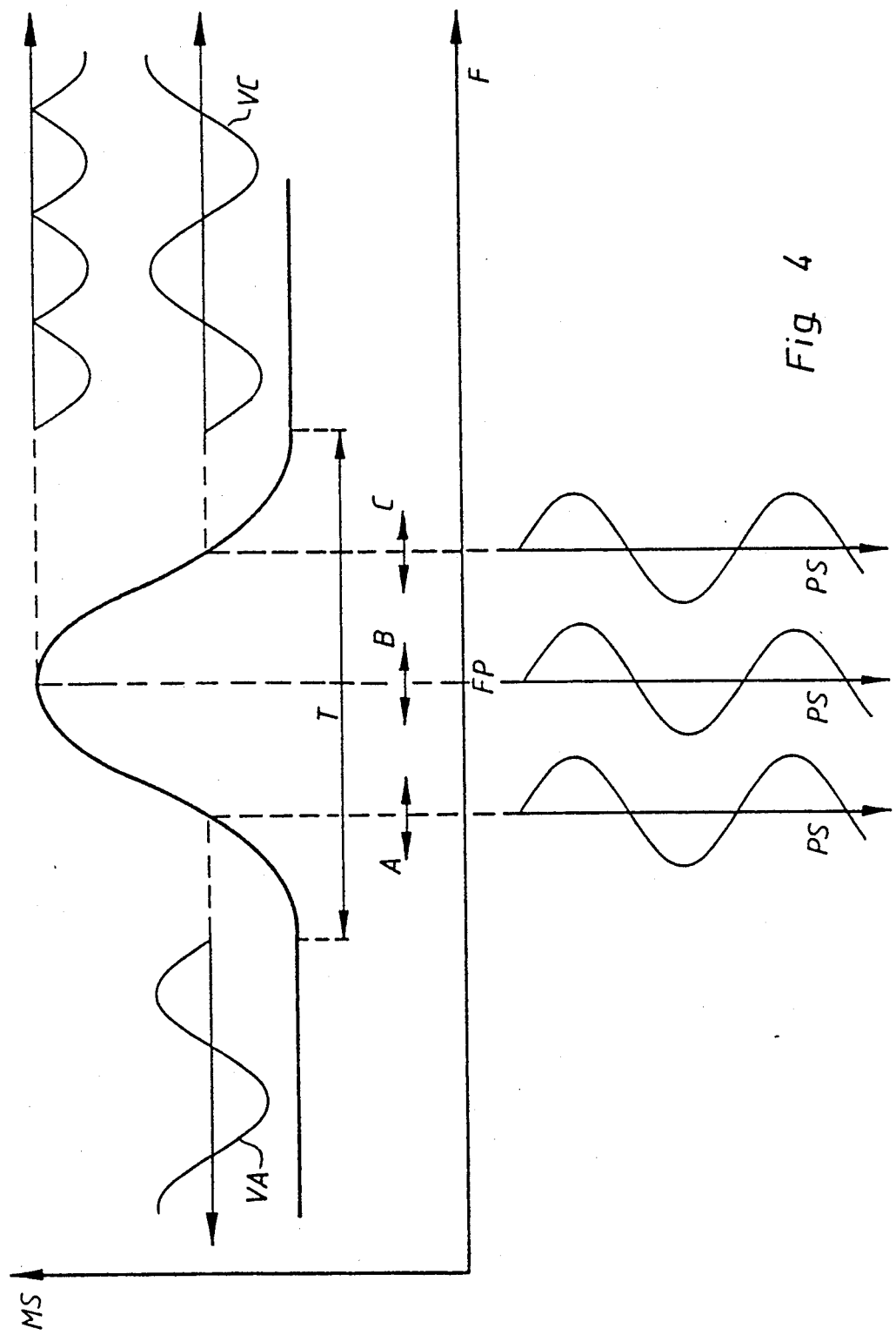

OPTICAL SCANNING ARRANGEMENT FOR MAINTAINING CONSTANT THE LIGHT OUTPUT OF A LASER BEAM OR THE LASER CURRENT

BACKGROUND OF THE INVENTION

The invention concerns an optical pick-up whereby a laser beam generated by a laser with a monitor diode is focused on an optical recorded medium by means of a focusing circuit, a periodic signal is supplied to one input terminal of a summation amplifier and to one input terminal of a multiplier, the output terminal of the multiplier is connected to another input terminal of the summation amplifier, the output terminal of the summation amplifier is connected to the positioning mechanism of the focusing circuit, and the actual value of the focusing circuit is supplied to still another input terminal of the summation amplifier.

The design and function of an optical pick-up for a compact-disk player are described in Electronic Components and Applications 6 (1984), 4, 209–14.

A focusing circuit for recording and playback equipment whereby data can be read from an optical recorded medium by means of a READ laser and recorded onto the medium by a WRITE laser is known from European Application 0 044 072.

The output terminal of a summation amplifier, to one input terminal of which a periodic signal is supplied from an oscillator, is connected in this focusing circuit to the positioning mechanism of the focusing circuit, usually a coil that displaces an objective lens. The periodic signal from the oscillator is also supplied to one input terminal of a multiplier, the output terminal of which is connected by way of a deep-pass filter to the second input terminal of the summation amplifier. The output signal from the focus detector, which is the actual value of the focusing circuit and is often called the focusing error, is supplied to the third input terminal of the summation amplifier, whereas the data signal detected by the laser beam and often called the high-frequency signal, is supplied to the second input terminal of the multiplier by way of a duty-cycle detector in order to establish the scanning situation. The focusing circuit focuses the laser beam very precisely on the optical recorded medium.

To ensure precise focusing and tracking of the laser beam in an optical pick-up of this type, however, the laser and the focus detector must be very precisely adjusted during the manufacturing process. Procedures of this type are very expensive because they take a lot of time and demand particular care.

SUMMARY OF THE INVENTION

The object of the invention is according to provide an optical pick-up in which the procedure of adjusting the laser and focus detector is considerably simplified.

This object is attained in one embodiment of the invention in that the light output of the laser is maintained at a constant level and the signal that controls the laser is supplied to the second input terminal of the multiplier.

The object is attained in another embodiment in that the laser current is maintained constant and the output signal from the laser's monitor diode is supplied to the second input terminal of the multiplier.

BRIEF DESCRIPTION OF THE DRAWINGS

FIG. 4 is a graph of the output signal from the monitor diode as a function of focus and of the output signal from the amplifier and the frequencY generator.

DESCRIPTION OF THE PREFERRED EMBODIMENTS

Figure 1:
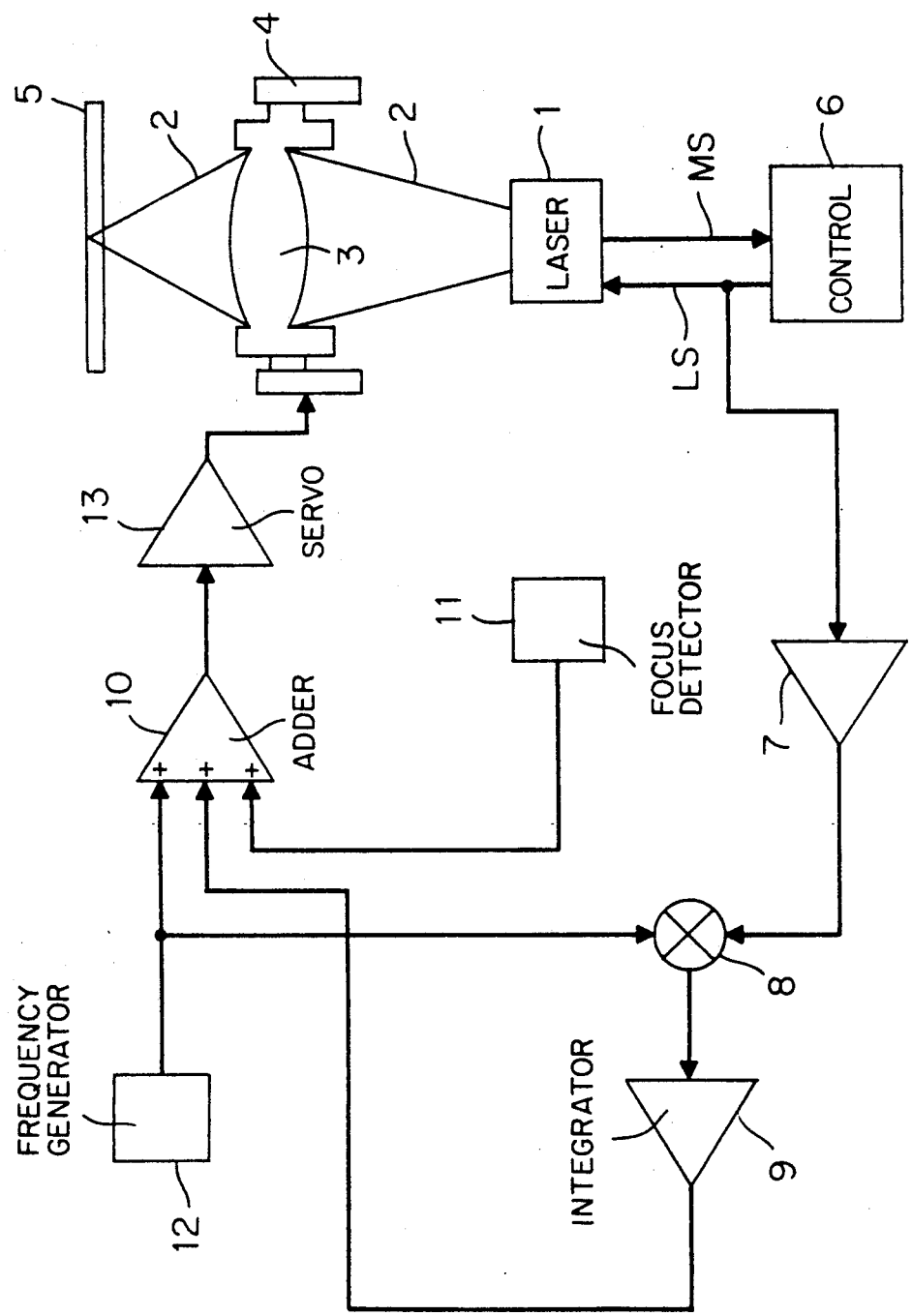
FIG. 1 represents one embodiment of the invention.
Figure 3:
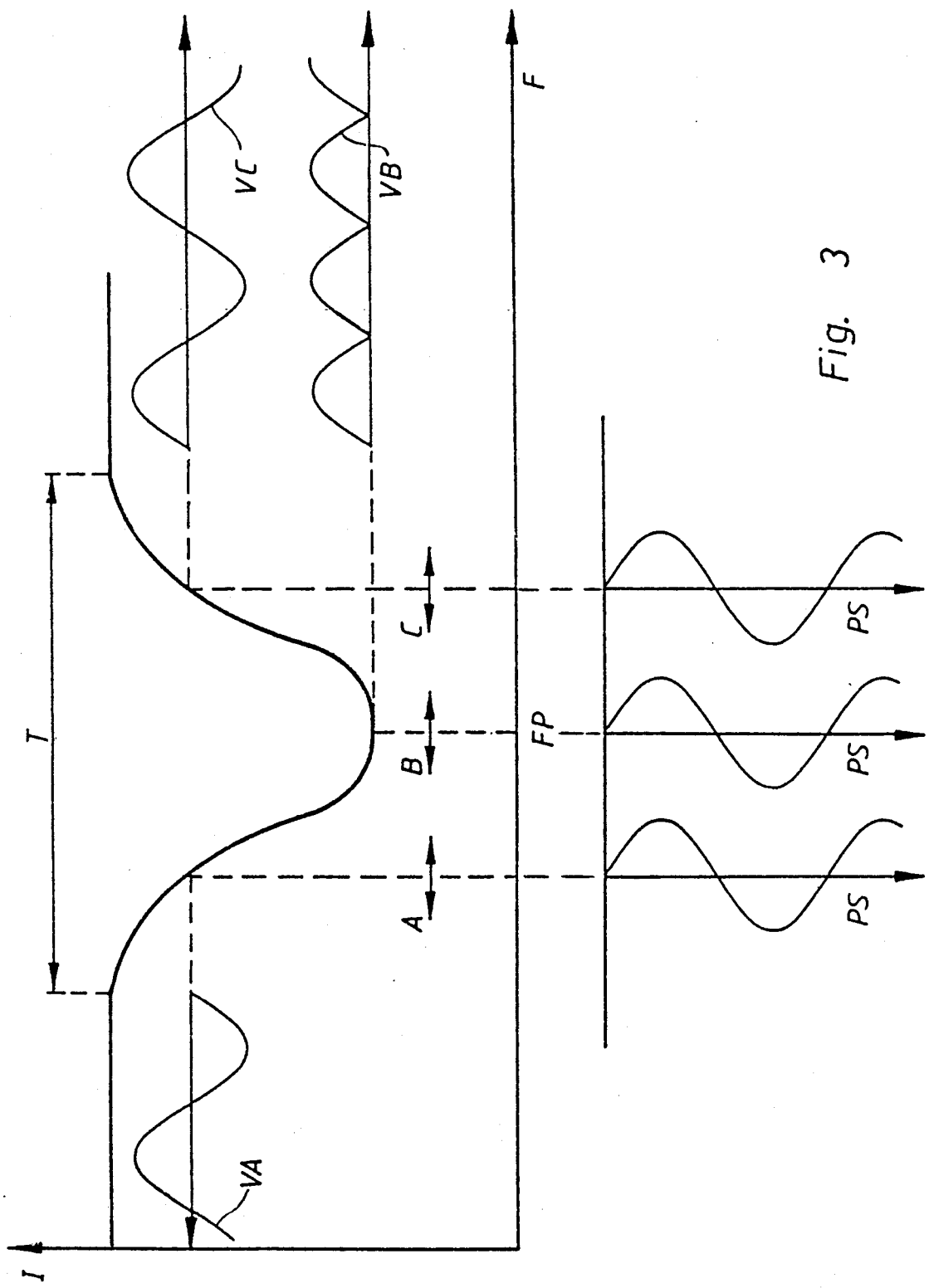
FIG. 3 is a graph of the laser current as a function of focus of the output signal from the amplifier and the frequency generator.

The invention will now be specified with reference to FIGS. 1 and 3.

The laser beams 2 emitted from a laser 1 are focused on a recorded medium, compact disk 5, by means of a lens 3 and a positioning mechanism 4. The light emitted from laser 1 is maintained at a constant light output by controls 6 in that the laser characteristic is temperature dependent. The signal that governs laser 1 arrives from controls 6 and by way of an amplifier 7 at one input terminal of a multiplier 8, the output terminal of which is connected to the input terminal of an integrator 9. The output terminal of a frequency generator 12 that generates a periodic signal PS impressed on the focusing circuit is connected to another input terminal of multiplier 8 and to one input terminal of a summation amplifier 10. The output terminal of integrator 9 is connected to another input terminal of summation amplifier 10, the third input terminal of which is connected to a focus detector 11 that generates an actual value, the focusing error, for the focusing circuit. The output terminal of summation amplifier 10 is connected to the input terminal of a servo amplifier 13, the output terminal of which is connected to the positioning mechanism 4 in the focusing circuit.

When laser beam 2 is precisely focused on compact disk 5, it reflects straight back against itself. In this situation the light output of the beam increases. In this embodiment, however, the light output is maintained at a constant level by controls 6 that regulate the laser current, and these controls react rapidly in relation to the frequency of periodic signal PS. In other words, controls 6 cancel out the variation in the light output of laser 1 occasioned by periodic signal PS by varying the laser current. The current is accordingly decreased when the focus is precise in order to maintain the light output of laser 1 at a constant level.

FIG. 3 represents laser current 1 as a function of focus F. When the focus FP is precise, laser current 1 is at a minimum. To the left of this minimum the focusing lens 3 is too far from recorded medium 5, and to the right it is too close to the disk. Arrows A, B, and C indicate what areas positioning mechanism 4 will have to displace lens 3 into in response to periodic signal PS.

Consider first situation A, in which the focus is approximate although lens 3 is still too far from recorded medium 5. The output signal VA from amplifier 7 is of the same frequency as the periodic signal PS from frequency generator 12 but in opposite phase. From this phase opposition the focusing circuit determines that positioning mechanism 4 will have to move lens 3 toward recorded medium 5 in order to arrive at point FP of precise focus. The signal at the output terminal of multiplier 8 causes summation amplifier 10 to move lens 3 toward recorded medium 5. When precise focus FP is exceeded, the output signal VB from amplifier 7 assumes the shape illustrated in FIG. 3, with twice the frequency of periodic signal PS. Because the signal at the output terminal of integrator 9, the integral of the products of signals PS and VB, assumes a constant level due to the doubled frequency of signal FB, it will no longer occasion any more movement on the part of lens 3 by way of summation amplifier 10. The focus is now optimal.

Situation C, in which the focus is approximate as in situation A although lens 3 is too near recorded medium 5, will now be discussed. The signal VC at the output terminal of amplifier 7 has the same frequency as and is in phase with periodic signal PS, informing the focusing circuit that lens 3 is too near recorded medium 5. The signal at the output terminal of integrator 9 now causes lens 3 to move just far enough away from recorded medium 5 for, as the point FP of precise focus is exceeded, the signal at the output terminal of integrator 9 to remain constant.

Without an integrator 9, a multiplier 8, and an amplifier 7, the focusing circuit could only bring lens 3 into a tolerance region T. Precise focus within tolerance region T, however, is possible only because the output signal from integrator 9 is supplied to one input terminal of summation amplifier 10.

Focusing error FE is, within a specific range, proportional to the deviation from optimal focus. The intensity P of the light reflected from recorded medium 5 can be described by means of a Taylor development:

$$P_r = P_o - \sum_{i=2}^{\infty} P_i \Delta^i \approx P_o - P_2 \Delta^2.$$

Laser current I according approximates $$I = I_o + I_2 \Delta^2,$$

wherein $I_o$ is the normal current.

When the periodic signal PS is impressed on the focusing circuit, the formula for the focusing error will be $$FE' = FE + f_o \sin \Omega t.$$

The pick-up will accordingly travel over the path $$\Omega = \Omega_o + \Omega_1 \sin \Omega t,$$

wherein $\Omega_o$ is the deviation from optimal focus and $\Omega_1$ is the amplitude of the path during modulation with $f_o$.

The laser current can then be represented by the equation $$I = I_o + I_2(\Omega^2_o + 2\Omega_o \Omega_1 \sin \Omega t + \Omega^2_1 \sin^2 \Omega t).$$

From this, a lock-in amplifier constructs, for $\tau >> 1/\Omega$ and $-\tau/2 \leq \tau \leq +\tau/2$, the integral $$L = 1/\tau \int (I_o + I_2[\Delta^2_o + 2\Delta_o \Delta_1 \sin \Omega t + \Delta^2_1 \sin^2 \Omega t]) \sin \Omega t \cdot dt = 1/\tau \int (I_o + I_2[\Delta^2_o + \Delta_1 \sin^2 \Omega t]) \sin \Omega t \cdot dt + 1/\tau \int \Delta_o \Delta_1 (1 - \cos 2\Omega t) \cdot dt = \Delta_o \Delta_1$$

in that, when the integration time is long enough, the integral can be solved as assigned to odd and even powers. The value is proportional to the deviation from the optimal focus.

Because integrator 9 solves the aforesaid integral, summation amplifier 10 causes positioning mechanism 4 to bring lens 3 into optimal focus extensively independently of how precise laser 1 and focus detector 11 are adjusted. The focusing circuit operates symmetrically around a midpoint constituted by this focus. In the focusing circuit described in European Application 0 044 072 on the other hand, the focus detector must be precisely adjusted in order to obtain a precise focus of the laser beam.

Figure 2:
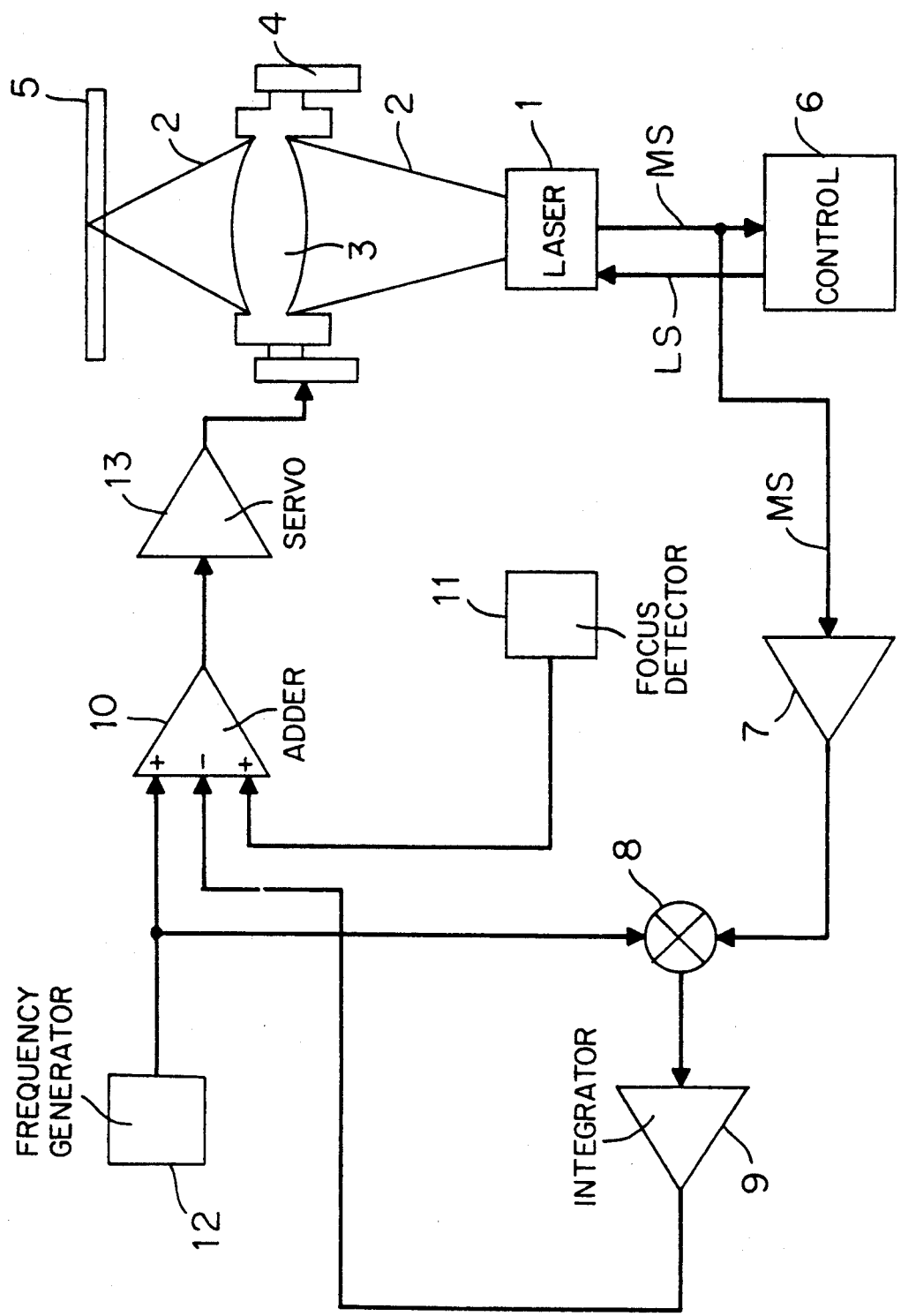
FIG. 2 represents another embodiment according to the present invention.

The embodiment of the invention illustrated in FIG. 2 will now be specified with reference to FIG. 4.

The circuitry illustrated in FIG. 2 differs from that illustrated in FIG. 1 in that the laser current is maintained constant, the output signal MS from the monitor diode in laser 1 is supplied to the second input terminal of multiplier 8, and the second input terminal of summation amplifier 10, to which the output signal from integrator 9 is supplied, is a subtraction input terminal. It is the output signal form the monitor diode in laser 1 and not the laser current, which is, in contrast to that in the first embodiment, maintained constant, that increases in this embodiment because the controls 6 that vary the light output in relation to the frequency of periodic signal PS react slowly. Controls 6 accordingly do not cancel out the rapid fluctuations in the light output of laser 1 occasioned by periodic signal PS but maintain the laser current at a constant level. With the light output being maintained constant accordingly, the signal LS that controls laser 1 must be supplied to the second input terminal of multiplier 8 whereas, with the laser current being maintained constant, it is the output signal from the monitor diode that must be supplied to the second input terminal of multiplier 8.

FIG. 4 illustrates the output signal MS from the monitor diode of laser 1 as a function of focus F. When the focus FP is precise, the output signal MS of the monitor diode is at a maximum. As with FIG. 3, arrows A, B, and C indicate what areas positioning mechanism 4 must move lens 3 into in response to periodic signal PS.

Consider first situation A, in which the focus is approximate although lens 3 is still too far from recorded medium 5. The output signal VA from amplifier 7 is of the same frequency as and is in phase with the periodic signal PS from frequency generator 12. The signal at the output terminal of integrator 9 causes summation amplifier 10 to move lens 3 away from recorded medium 5 until the signal at the output terminal of integrator 9 no longer changes. This is what happens when the focus is precise. The output signal VB from amplifier 7 assumes the shape illustrated in FIG. 4, with twice the frequency of periodic signal PS. Because the signal at the output terminal of integrator 9, the integral of the products of signals PS and VB, is constant due to the doubled frequency of signal VB, it will no longer occasion any more movement on the part of lens 3 by way of summation amplifier 10. The focus is now optimal.

Finally, situation C, in which the focus is approximate as in situation A although lens 3 is too near recorded medium 5, will now be discussed. The signal VC at the output terminal of amplifier 7 has the same frequency as periodic signal PS but the opposite phase. The signal at the output terminal of integrator 9 now causes lens 3 to move just far enough away from recorded medium 5 for, as the point FP of precise focus is exceeded, the signal at the output terminal of integrator 9 to remain constant.

Here again, without an integrator 9, a multiplier 8, and an amplifier 7, the focusing circuit could only bring lens 3 into tolerance region T. Precise focus within tolerance region T, however, is possible only because the output signal from integrator 9 is supplied to one input terminal of summation amplifier 10.

The invention is appropriate for compact-disk players, videodisk players, DRAW disk players, and opticomagnetic equipment.

What is claimed is:

1. An optical scanning arrangement comprising: a source with a monitor diode for generating a laser beam with a light output; an optical recording medium; a focusing circuit for focusing said laser beam on said optical recording medium; a source of a periodic signal with an output; a summation amplifier having a first input terminal connected to the output of said source of periodic signal; a multiplier having a first input connected to the output of said source of periodic signal; and multiplier having an output connected to a second input of said summation amplifier; said focusing circuit having positioning means; said summation amplifier having an output connected to said positioning means; said focusing circuit having an actual value of focus error supplied to a third input of said summation amplifier; a control source connected to said laser beam generating source for providing a laser controlling signal to a second input of said multiplier and to said laser beam generating source to maintain the light output of said laser beam at a constant level, said light output of said laser beam tending to vary due to said periodic signal, variations of the light output being substantially eliminated by said control source to maintain said light output of said laser beam at said constant level, so that said laser beam is focused by said controlling signal.

2. An optical scanning arrangement as defined in claim 1, wherein said periodic signal has a frequency, said laser controlling signal having a frequency that is greater than the frequency of said periodic signal.

3. An optical scanning arrangement comprising: a source with a monitor diode for generating a laser beam with a light output; an optical recording medium; a focusing circuit for focusing said laser beam on said optical recording medium; a source of a periodic signal with an output; a summation amplifier having a first input terminal connected to the output of said source of periodic signal; a multiplier having a first input connected to the output of said source of periodic signal; said multiplier having an output connected to a second input of said summation amplifier; said focusing circuit having positioning means; said summation amplifier having an output connected to said positioning means; said focusing circuit having an actual value of focus error supplied to a third input of said summation amplifier, said source for generating the laser beam having laser current; controlling means connected to said laser beam generating source for controlling said laser current; said monitor diode having an output connected to a second input of said multiplier and to said controlling means for maintaining said laser current constant, said laser current tending to vary due to said periodic signal, variations in said laser current being substantially eliminated by said controlling means to maintain said laser current at said constant level so that said laser beam is focused by said controlling means.

4. An optical scanning arrangement as defined in claim 3, wherein said periodic signal has a frequency, said controlling means operating said laser beam generating source with an operating frequency that is less than the frequency of said periodic signal.

* * * * *